United States Patent [19]

Kraus

[11] 3,903,978
[45] Sept. 9, 1975

[54] SKID-STEERED VEHICLE TRANSMISSION

[75] Inventor: Peter B. Kraus, Lisbon, N. Dak.

[73] Assignee: Clark Equipment Company, Buchanan, Mich.

[22] Filed: Nov. 12, 1973

[21] Appl. No.: 415,182

[52] U.S. Cl. .............................. 180/6.48; 91/505
[51] Int. Cl.² ............................................ B62D 11/04
[58] Field of Search ............ 180/6.48, 6.3; 91/504, 91/505; 417/454, 539

[56] References Cited
UNITED STATES PATENTS

| | | | |
|---|---|---|---|
| 1,287,026 | 12/1918 | Janney | 91/505 |
| 2,359,758 | 10/1944 | Hamren | 180/6.48 |
| 2,791,284 | 5/1957 | Jackson | 180/6.48 |
| 3,792,744 | 2/1974 | Gray | 180/6.48 |
| 3,811,801 | 5/1974 | Buse | 417/454 |

FOREIGN PATENTS OR APPLICATIONS

| 745,560 | 2/1933 | France | 417/539 |

Primary Examiner—David Schonberg
Assistant Examiner—John A. Pekar
Attorney, Agent, or Firm—Jack E. Toliver

[57] ABSTRACT

A skid-steered vehicle, especially an end loader, having a hydrostatic transmission. The transmission will have a series pump unit comprising two pump sections separated by a midplane porting block. Each pump section includes an axial piston group rotating on a common axis on opposite sides of the block. A pair of arcuate ports in each side of the block circumjacent the axis of rotation are in fluid communication with each piston group. Internal passages within the block include at least one passage communicating with one arcuate port of each pair which crosses from one side of the axis of rotation to the other before reaching an exposed surface of the block. In this manner, the external crossing of hydraulic hoses is eliminated facilitating shorter, more direct hydraulic coupling with associated hydraulic components.

3 Claims, 9 Drawing Figures

SKID-STEERED VEHICLE TRANSMISSION

BACKGROUND OF THE INVENTION

The invention pertains generally to the art of compact, self-propelled, rigid frame, skid-steered vehicles and tractors having hydrostatic transmissions.

DESCRIPTION OF THE PRIOR ART

In a skid-steered vehicle having dual hydrostatic transmissions, the engine usually drives the two transmissions through a transfer case. The transfer case is mounted between the engine and transmissions. It will have a single input shaft driven by the engine and two output shafts. Two independent hydrostatic transmission pumps, each of the variable delivery, reversible swash plate type, have their input shafts coupled to the respective output shafts of the transfer case. Such an arrangement is disclosed in U.S. Pat. No. 3,635,365 filed Feb. 20, 1969 entitled Tractor Vehicle with Hydrostatic Drive Means, inventor James J. Bauer, assigned to the assignee of the present invention.

While this arrangement has proved satisfactory, the limited space problems of compact, skid-steered loaders raises special problems not solved by this construction. As an example, the transfer case takes up room that could be used for other components.

Also, the transfer case is an inherently expensive component requiring its own casting, bearings, shafts and drive elements. In addition, the transfer case is partially filed with oil and requires periodic maintenance. Moreover, it adds weight to the machine.

It has also been common practice to simplify the coring or boring of passages in cast parts and instead complicate the hydraulic hosing providing fluid communication between the hydrostatic components. This practice has its advantages in reducing the costs of the casting but in a compact loader further encumbers the available external space with hydraulic lines and fittings.

SUMMARY OF THE INVENTION

The vehicle will have a body providing a transmission compartment in front of the engine. A series pump unit will be coupled to the engine output shaft on a longitudinal axis centered in the compartment. Hydrostatic motors are mounted at a lower level in the compartment. The axes of rotation of the motors are transverse to the longitudinal axis of the pump unit. The motor output shafts lie between the front and rear axles and drive gear reduction boxes on opposite sides. Drive sprockets within the compartment on the ends of the axles are driven by endless chains driven from output sprockets of the gear boxes.

A body of this type is disclosed in copending U.S. Patent application Ser. No. 329,939, entitled "Tractor Vehicle Having Material Handling Subframe", filed Feb. 5, 1973 — inventor John Heggen, and assigned to the assignee of this invention.

By "compact" as used herein, the reference is to a selfpropelled vehicle such as disclosed in U.S. Pat. No. 3,231,117 entitled "Tractor Vehicle and Drive Therefor" issued Jan. 25, 1966 and partially assigned to the present assignee and particularly one having a hydrostatic drive as disclosed in the U.S. Pat. No.3,635,365.

Such a vehicle will normally have a shorter wheel base than the center-to-center distance between the tire treads measured between wheels on opposite sides of the machine. As a result, space limitations are critical because the front and rear axles are closer together than the wheels on opposite sides are far apart. Under conditions where body spaced laterally is wider than it is long the present invention permits the arrangement of the hydrostatic components in a transmission package especially suited for such compact bodies.

In the present invention the series pump unit uses a midplane porting block between a pair of axial piston groups rotatable on a common axis. The porting block has opposed faces against which the piston groups rotate. Arcuate ports in each face on opposite sides of the axis of rotation are in fluid communication with the suction and pressure sides of the piston groups. Internal passages connect the arcuate ports to an external surface of the porting block for connection with hydraulic hose lines to the associated hydrostatic motors. The arrangement of passages is such that at least one passage from each port on the side of the rotational axis opposite the hydrostatic motor with which it is directly connected crosses the rotational axis from one side to the other within the block in reaching the exterior surface thereby eliminating the external crossing of hose lines.

In the preferred embodiment the porting block is situated between two pump sections driven directly by the engine output shaft. The block has an enlarged axial bore aligned with the engine shaft. The rotating piston groups in each pump section are interconnected by a shaft extending through the bore. Means for independently varying the displacement of the rotatable piston groups provides reversible suction and pressure areas on opposite sides of the axis of rotation. The arcuate ports of the porting block are in registry with the suction and pressure areas of the pump sections. These ports are in fluid communication with the corresponding suction and pressure sides of a pair of hydrostatic transmission motors driven by the associated pump sections.

While this is a preferred embodiment of the invention, it will be appreciated that the porting block arrangement is considered novel in itself and could be used to combine either series pumps or motors of the variable or fixed delivery type with equal advantage where the associated hydrostatic components are coupled by hydraulic hose lines in a restricted space.

These and other advantages will be more apparent by referring to the following detailed description which proceeds with a description of the drawings.

DESCRIPTION OF THE PREFERRED EMBODIMENT

Figure 1:
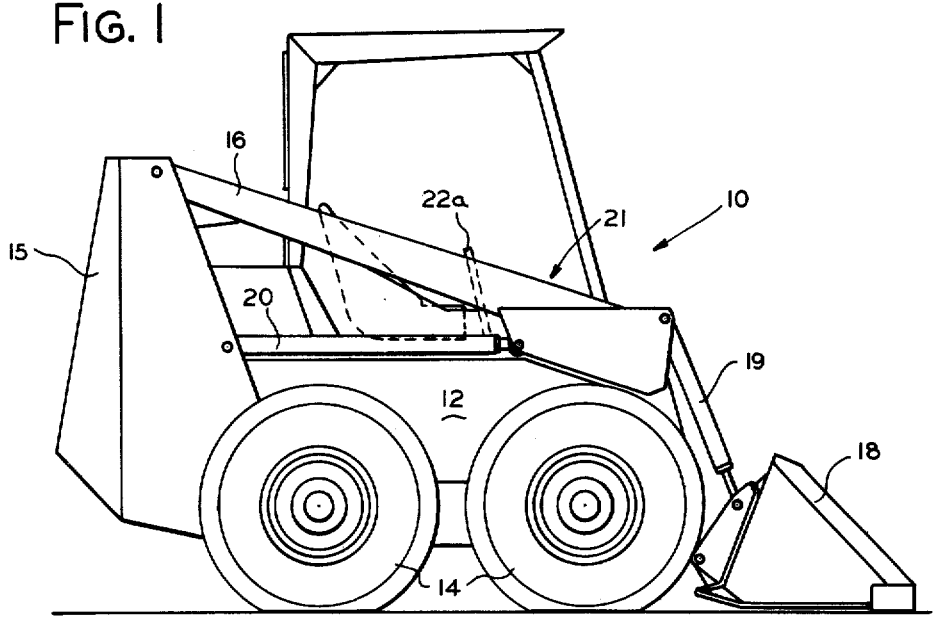
FIG. 1 is a side elevational view of a self-propelled, rigid frame, skid-steered end loader vehicle of the type advantageously employing the present invention.

FIG. 1 shows a self-propelled, rigid frame, skid-steered end loader having a body 12, a pair of wheels 14 on each side of the body 12, a pair of stanchions 15 projecting upwardly at the rear on each side and pivotally supporting at the upper ends thereof a pair of boom arms 16 which in the lowered position extend forwardly and downwardly at the front mounting a material handling bucket 18. A pair of bucket dump and tilt cylinders 19 and a pair of lift arm cylinders 20, one on each side of the loader, are controlled by the operator through the use of foot pedals (not shown) located adjacent the operator's feet generally at 21. A pair of control levers 22a, 22b one on either side of the operator's seat, is used to control the hydrostatic transmission. The transmission, as described later, will independently drive the wheels 14 on opposite sides of the loader in either forward or reverse directions at variable speeds to both propel and steer the vehicle.

The control levers 22a, 22b operate the transmission through a combined, transversely extending shaft (FIG. 2) having separately rotatably sections 25, 26. The rotation of either section moves an associated linkage longitudinally which changes the angle of one of the swash plates of the series pump unit 30. A control of the type referred to is disclosed in U.S. Pat. No. 3,605,519 entitled "Control for Dual Hydrostatic Drive" issued Sept. 20, 1971 to the assignee of the present invention; John P. Heggen, the inventor. Hydrostatic motors 23, 24 are hydraulically coupled by hose lines 32, 33 to the pump unit 30. While the internal construction of the motors 23, 24 is not shown, it will be appreciated that each motor will have a rotating piston group and inclinable swash plate which will normally have a fixed position in relationship to the associated pump swash plate in the unit 30. A closed hydraulic loop will thus be established between the suction and pressure sides of the pump and motor piston groups. In FIG. 3 dotted lines are used to represent the hydraulic hoses 32, 33 shown in FIG. 2. The angle of the motor swash plate may be changed depending on whether a high or low speed is desired. A selector lever 38 (FIG. 2) is connected by a linkage 39 to a transverse shift lever 40. The lever 40 connects the two swash plate control arms 41, 42 of the motors to simultaneously shift the motor swash plates between the high or low speed positions. Within either of these positions, the speed is variable between zero and maximum in either forward or reverse by varying the angle and direction of tilt of the pump swash plates controlled by the levers 22a, 22b. For details as to the shift control, reference is made to the copending application entitled "Two-Speed Motor Control for Dual Hydrostatic Transmission", Ser. No. 400,462, filed Sept. 24, 1973, assigned to the assignee of the present invention and particularly to FIG. 5 and the description pertinent thereto which shall be incorporated by reference herein.

Figure 8:
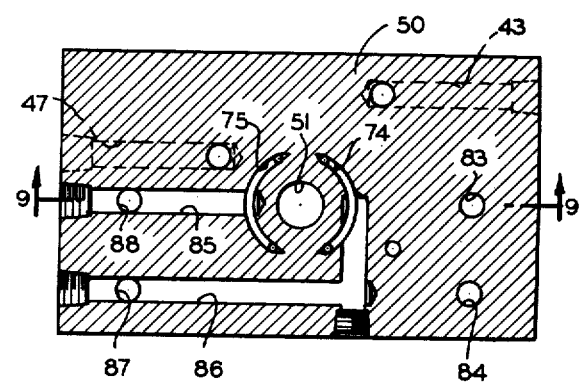
FIG. 8 is another cross-sectional view through the porting block approximately along line 8—8 of FIG. 5.

While internal details of the motors are not shown, reference is made to FIG. 8 in the aforementioned U.S. Pat. No. 3,635,365 and the description in the specification of that patent at column 4, lines 40–68 where such description of this general type of motor may be found if necessary for a better understanding and to the extent necessary that description and drawings are incorporated by reference herein.

Figure 2:
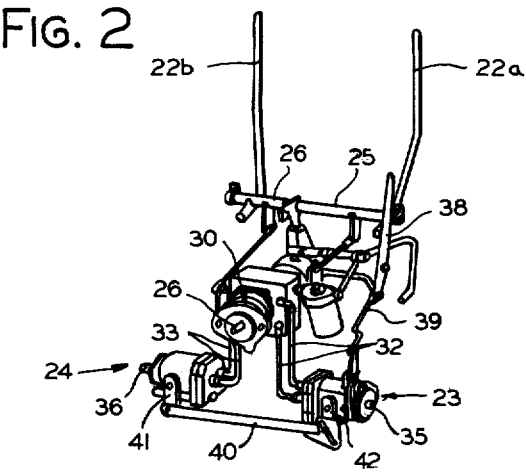
FIG. 2 is a perspective view of the hydrostatic transmission and transmission controls package isolated from the loader in FIG. 1.
Figure 3:
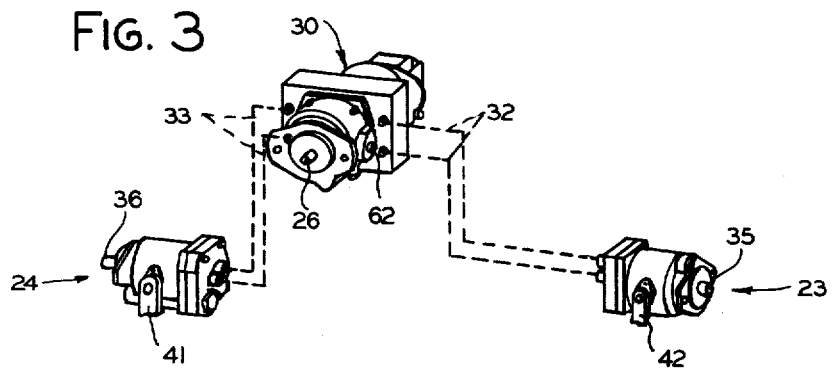
FIG. 3 is a partial exploded view of the pump and motor components of the transmission package in FIG. 2.
Figure 4:
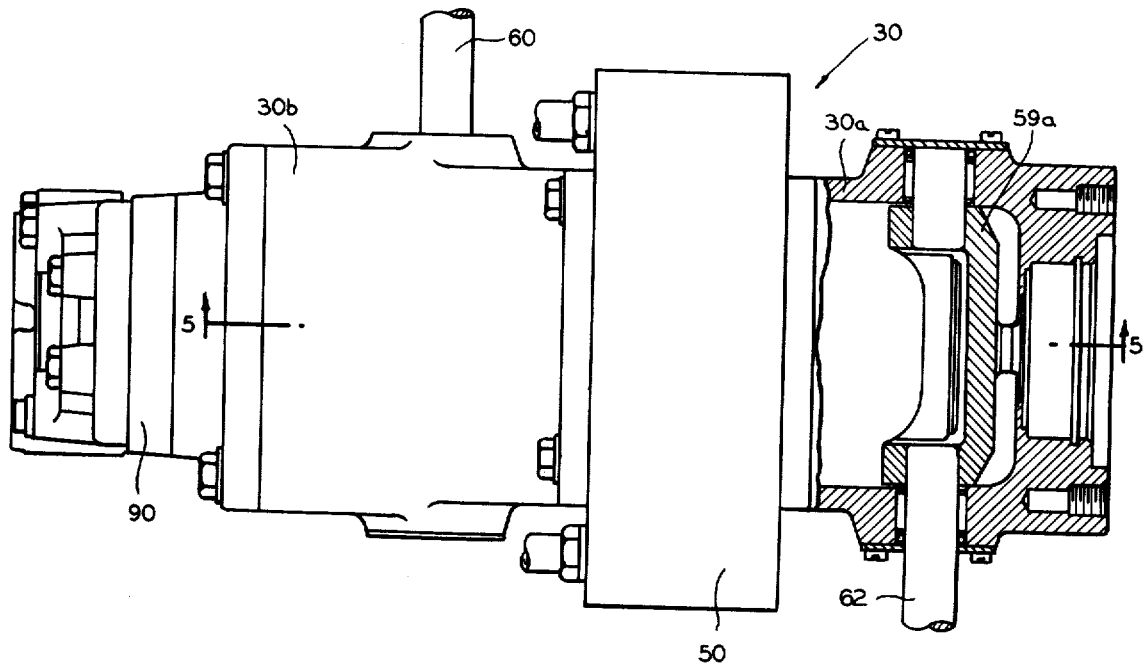
FIG. 4 is a top view of the series pump unit broken away showing the swash plate yoke trunion of one pump section.

The transmission and transmission control package in FIG. 2 will be received in the body 12 forward of the engine (not shown). The engine is mounted in the rear between the stanchions 15. Its output shaft 26 is centered longitudinally of the vehicle body. It is important to note that in compact, skid-steered vehicles either having a body with two, laterally spaced side compartments having separate chain drive for the wheels (U.S. Pat. No. 3,635,365) or having single center compartment housing both chain drives (application Ser. No. 329,939), there is limited space between the wheels. However, the present invention provides a transmission layout arranged especially for such compact machines where the series pump 30 is on a common axis with the engine torque shaft and the motors 23, 24 are arranged transversely below.

The motor output shafts 35, 36 may be on a common transverse axis as in FIG. 2 or on different axes as also disclosed in the aforementioned application Ser. No. 400,462. The motor shafts will drive separate gear boxes (not shown) mounted between the wheels on each side of the body 12. Drive sprockets on each of the axle shafts for the wheels 14 will be driven by endless chains from an output sprocket of each gear box. Dual gear reduction chain drives of this type are disclosed in the aforementioned U.S. Pat. No. 3,635,365 and particularly a reference is made to FIGS. 3, 4, 9, 10, 11 and 13 and the description commencing at Column 7, line 41 of that patent which shall be considered incorporated by reference herein.

The body space will also accommodate a hydraulic fluid reservoir. In the copending application Ser. No. 329,939, the center compartment is sealed so that it serves as its own reservoir. The present transmission package is designed to exist within such environment; that is the motors 23, 24 may be in the same compartment as the hydraulic fluid used for operating the transmission and auxiliary functions. A hydraulic circuit for charging the pump unit 30 will be sourced with fluid from this reservoir and connects with inlet 43 and outlet 47 (FIG. 8) of the porting block 50 which, through internal passages, supplies fluid to the cylinders 64 0a, 64b. For a changing circuit of a similar type reference is made to U.S. Pat. No. 3,646,596 entitled "Fluid System for a Vehicle with Fluid Drive Means", issued Feb. 29, 1972; inventor James J. Bauer, assigned to the assignee of the present invention and particularly to FIG. 2 and that portion of the description which may be considered necessary for a better understanding of this invention.

THE SERIES PUMP UNIT

The series pump unit 30 (FIGS. 4, 5) has two sections 30a, 30b each with a variable displacement, rotating piston group 48a, 48b which is driven on the same axis as the engine shaft 26. A pair of bearings 43, 44, one at each end of the unit 30, rotatably supports the shafts 26a, 26b within the housing sections 45a, 45b. The shaft 26a is splined to the rotating piston group 48a while the shaft 26b is splined to the rotating piston group 48b. A porting block 50 has an axial bore 51 aligned with the engine shaft 26. A pair of bearings 52a, 52b at each end of the bore rotatably supports the ends of the shafts 26a, 26b within the porting block bore 51. Shafts 26a, 26b are connected together for rotation by an internally splined sleeve in the bore 51 that receives the externally splined ends of the shafts 26a, 26b.

The swash plates 58a, 58b of the respective pump sections 30a, 30b are mounted on yoke trunnions 59a, 59b which may be independently tilted in either direction from a neutral or zero displacement position. The yoke trunnion for the swash plate 58a includes the shaft 62 (FIG. 4) which is connected by a linkage to the shaft section 26 of control lever 22b (FIG. 2). Likewise the yoke trunnion 59b is tilted by a shaft 60 (FIG. 5) connected to control shaft section 25 of control lever 22a.

Figure 7:
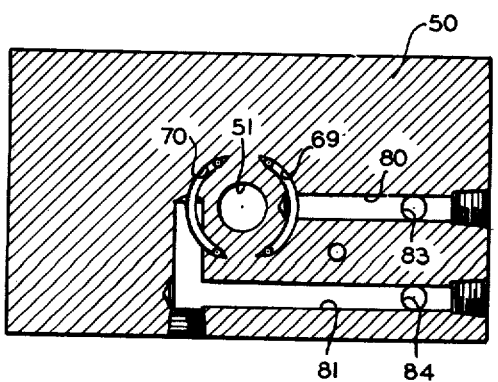
FIG. 7 is a cross-sectional view through the porting block approximately along line 7—7 of FIG. 5.

Each rotating piston group 48a, 48b will comprise an annular array of cylinders 64a, 64b receiving pistons 65a, 65b each of which will have a ball and socket connection 66a, 66b with a slipper foot 67a, 67b held in sliding contact with the annular swash plate 58a, 58b. Each of the cylinders 64a, 64b communicates through ports 68a, 68b with a pair of arcuate pressure and suction kidney ports 69, 70, (FIG. 7) 74, 75 (FIG. 8). These will, of course, reverse from pressure to suction depending on which direction the swash plate is tilted from neutral. The cylinders 64b of the rotating piston group 48b are in fluid communication with kidney ports 74, 75 on the opposite face of the porting block 50 (FIG. 8) from the cylinders 64a (FIG. 7). Internal lateral passages 80, 81 bored in the porting block connect with axial passage 83, 84 to connect the suction and pressure ports 69, 70 with the corresponding suction and pressure sides of the motor 23 in a closed hydraulic loop through the hose lines 32 (FIG. 3). Also internal lateral passages 85, 86 connect with axial passages 88, 87 to connect the pressure and suction ports 74, 75 (FIG. 8) at the opposite end of the porting block with the corresponding suction and pressure sides of the motor 24 in the closed hydraulic loop through the lines 33.

Thus, the motor shafts 35, 36 may be driven at variable speeds in either forward or reverse directions while the pump shafts 26a, 26b rotate continuously in one direction at constant speed. This, of course, is obtained by varying the angle of the swash plates 58a, 58b to vary the speed; or to reverse direction, by tilting the swash plate in the opposite direction.

Figure 5:
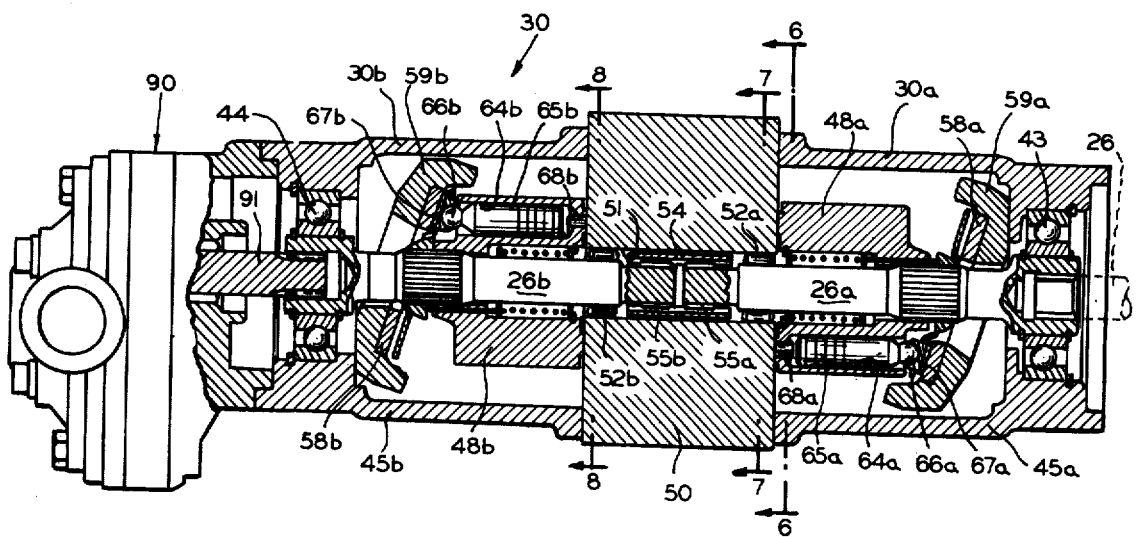
FIG. 5 is a partial longitudinal sectional view of the series pump taken approximately along line 5—5 of FIG. 4.
Figure 6:
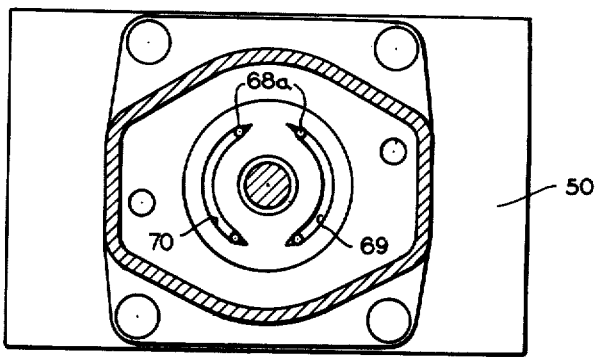
FIG. 6 is a cross-sectional view taken approximately along line 6—6 in FIG. 5.
Figure 9:
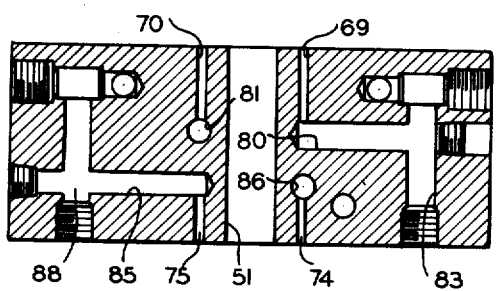
FIG. 9 is a horizontal sectional view taken approximately along line 9—9 of FIG. 8.

In a loader there will be a separate hydraulic circuit for the lift arm cylinders and bucket cylinders. Reference is made to FIG. 20 of U.S. Pat. No. 3,635,365 as well as the description commencing at column 10 line 44 for the details of such a circuit. In the present invention, a gear pump 90 is driven by an axial extension 91 of the pump shaft 26b (FIG. 5). This pump will be connected by appropriate hydraulic lines with the cylinders 19, 20 operating the bucket and lift arms of the loader.

It is important to note that the kidney port on the side of the axis of rotation opposite from the motor with which it is associated would most directly and simply be connected to the adjacent exterior side surface of the porting block and there be connected by a hydraulic hose to the corresponding suction or pressure side of the motor. However, this arrangement would require that the hoses cross from one side of the porting block to the other in addition to requiring fittings for this type of angle. However, in the present invention the passages 81, 86 from the remote kidney port cross from one side of the rotational axis to the other internally and thus exit the porting block on the side adjacent the associated motor. This eliminates the external crossing of hoses and simplifies the plumbing. In addition, the length of hose required is reduced and clearance in the body space otherwise required around the porting block area is improved.

The foregoing detailed description of my invention is intended to be illustrative only, and while three embodiments of it have been described, it will be understood that it is subject to various other modifications and changes. Consequently, the scope of my invention should be determined from the following claims:

I claim:

1. In a four-wheeled drive, skid-steered vehicle having limited body space between the wheels and an engine in the rear, a hydrostatic transmission arrangement for such limited space including a pump having two pump sections, a porting block between the two pump sections having an axial bore, rotatable piston groups in each pump section, shaft means interconnecting the rotatable piston groups through said bore, said shaft means being driven by the engine, a source of hydraulic fluid supplying said rotatable piston groups, means for independently varying the displacement of said rotatable piston groups between the reversible suction and pressure areas on opposite sides of said shaft means, a pair of ports in each of the opposite faces of said porting block aligned with the suction and pressure areas of said piston groups, a pair of hydrostatic motors each having a rotatable piston group, means fixed in relationship to said independently variable means for displacing the piston groups of each motor in suction and pressure areas corresponding to the reversible suction and pressure areas of said pump piston groups and gear reduction means driven by said motors on opposite sides of the vehicle for driving said wheels, the improvement comprising a passage network in said porting block providing fluid communication from said pairs of ports to an exterior surface of the block at spaced locations including first passage means for each pair of ports that connects one port with said exterior surface by crossing from one side of the axis of rotation to the other, second passage means that connects the other part of each pair of ports with said exterior surface without crossing the axis of rotation and fluid filled conduits connecting said first and second passage means at each spaced location with the respective hydrostatic motor closest to said location.

2. The improvement according to claim 1 wherein the said first passage means for one pair of ports extends laterally from one direction and the other laterally from the opposite direction.

3. The improvement according to claim 2 wherein said first and second passage means are joined by third passage means parallel to the rotational axis which terminate at said spaced locations at one face of the porting block on opposite sides of the rotational axis.

* * * * *